(12) United States Patent
Pettee

(10) Patent No.: X4055
(45) Date of Patent: Mar. 15, 1825

(54) MOTION, CHANGING

(76) Inventor: Otis Pettee

Elis Pellee

Letters Patent

The Schedule referred to in these Letters Patent and making part of the
same containing a description in the words of the said Eli[illegible] Pellee himself,
of his improvement in changing the motion of machinery, To be it known that I the said Eli[illegible] Pellee have invented constructed and
applied to use a new and useful improvement for producing any required change
in the velocity of machinery while in motion The following is a description of the
said invention and [illegible] the manner of using the same.

I take two cylinders of iron or other metal placing the same parallel to each
other at a convenient distance apart. [illegible] of the cylinders has a uniform rotary
motion communicated to it by means of a wheel placed at either end. There is firmly
[illegible] fixed upon this cylinder a series of cog wheels contiguous to one another of various
sizes. There is also placed upon the other cylinder a series of cog wheels contiguous to
one another and bearing such a proportion to the former series as that being
constantly in contact with the former there is communicated to each of the latter a
certain required velocity. The latter wheels are not fixed but revolve separately
on the cylinder as on an axis. The object now is to give the cylinder at dif-
ferent times the various degrees of velocity with which the wheels which are placed
upon it move. This object is effected by fixing firmly upon the cylinder one of
the wheels at a time and then disengaging it and immediately fixing the wheel
contiguous, the different wheels thus communicating successively to the cylinder
their [illegible] velocities. These wheels are [illegible] [illegible] [illegible] [illegible]
[illegible] the following manner. The cylinder on which they are placed [illegible] [illegible]
[illegible] there is inserted into it a small iron frame much like the wooden frame
of an [illegible] [illegible] which is made to slide easily within the cylinder. [illegible]
side of this frame is placed a spring with a [illegible] [illegible] [illegible] [illegible]
a slit or groove made through the side of the cylinder the catch [illegible]
[illegible] a little without the cylinder. The inner surface of each of the [illegible]
wheels is notched so that when the slide is moved the catch [illegible] into a notch in one of the wheels and thus fixes the wheel firmly to the cylinder. It
is found convenient to have two separate springs catches fixed to the iron
frame [illegible] to each other so that if one of them should not strike a notch
the other will. The slider frame above described is moved by means of a
[illegible] rack to which it is attached with a swivel so as to allow the slide
to revolve when the rack remains at rest. On the upper side of the rack
there is a number of teeth equal to half the number of wheels on the cyl
inder and [illegible] the distance between the several teeth being twice the
thickness of one of the wheels. These teeth are operated upon by two stops
or hammers one of which is placed forward of the other the thickness of
one of the wheels. These stops regulate the drawing out of the rack. They
being lifted alternately so that when one is rising to free a tooth, the
other is down to receive the next. The time of the motion of these stops
is [illegible] regulated so as to allow the cylinder to move with such veloci-
ty as may be required. When the velocity is to be changed the hammer
which [illegible] the rack [illegible] rises and the rack is drawn out the thick
ness of one of the wheels, when it is stopped again by the other hammer.
The rack is drawn out by means of a strap and weight. When all the
movable wheels have been [illegible] upon the [illegible] the rack is [illegible] by means of
a pinion working against the teeth on the underside of the rack and
turned by a winch. The cylinder first described has a shoulder on it
each end. The other cylinder has [illegible] a wedge on it at one end
the [illegible] end [illegible] which the rack passes turning on its circumference.
When a great variety of changes is required it is best that the first describe[d]
cylinder should be hollow to render it less flexible. The manner above
described of fixing and releasing the wheels is that which I have applied
to use. But the same effect may be produced by having the cylinder
to which these wheels are attached solid and the slide moving in a
groove in the side of the cylinder. The slide in this case being a thin
[illegible] plate of iron with a spring catch at one end which is to [illegible]
the wheels [illegible] as in the other case. The groove being the whole
length of the cylinder and sufficiently deep to admit the slide to move
freely in it while the cylinder is turning. The outer end of the slide should be bent at right angles so as to come in a line with [illegible] of the cylinder and it [illegible] attached to the rack and [illegible] it as in the other case In order that the slides may have a [illegible] mo-tion it may be convenient to have two grooves in the cylinder opposite each other and two slides moving in them like the [illegible] of a [illegible] the springs having a spring catch so regulated that if one of them [illegible] not strike a notch in the wheel the other will [illegible] of these con-trivances is used I consider the principle the same in each which consists in producing any required change in the velocity of motion [illegible] in motion by means of a series of cog wheels moving with different velocities and [illegible] upon a cylinder or upon an axis and being successively fixed and disengaged when [illegible] by means of a sliding spring catch which passes into notches cut into the [illegible] of the wheels these wheels [illegible] the motion from another series of wheels attached firmly to another cylinder which moves with an uniform velocity and the slide being moved on and by a rack with which it is connected and upon which it [illegible]. The machinery on which the above invention has been applied to use is a [illegible] spinder for spinning cotton. But I claim the exclusive right of using the same as well in this as in any other machinery.

In testimony that the above is a true specification and descrip-tion of my said invention I have hereto set my hand and seal the third day of February in the year of our Lord one thousand eight hundred and twenty five.

[illegible]

[illegible] [illegible]

Witnesses
[illegible] [illegible]
Benj[n] E. Nichols (1190 Words)

2—328 a.

DRAFTSMAN'S DIVISION.

*All communications should be addressed to "The Commissioner of Patents. Washington, D. C."*

*DEPARTMENT OF THE INTERIOR,*

United States Patent Office,

*Washington, D. C.,* ........ *189*....

*SIR:*

*The printed* ........ copies *of Patent No.* O Petter Mar 15 1825

........ are ........ *exhausted.*

*As soon as printed a copy will be mailed you to complete your order.*

*By direction of the Commissioner:*

*Very respectfully,*

................................

*Chief Clerk.*

314306-97-5m